Sept. 12, 1939. W. J. FOSTER 2,172,791
WINDSHIELD WIPER ARM
Original Filed Aug. 21, 1933
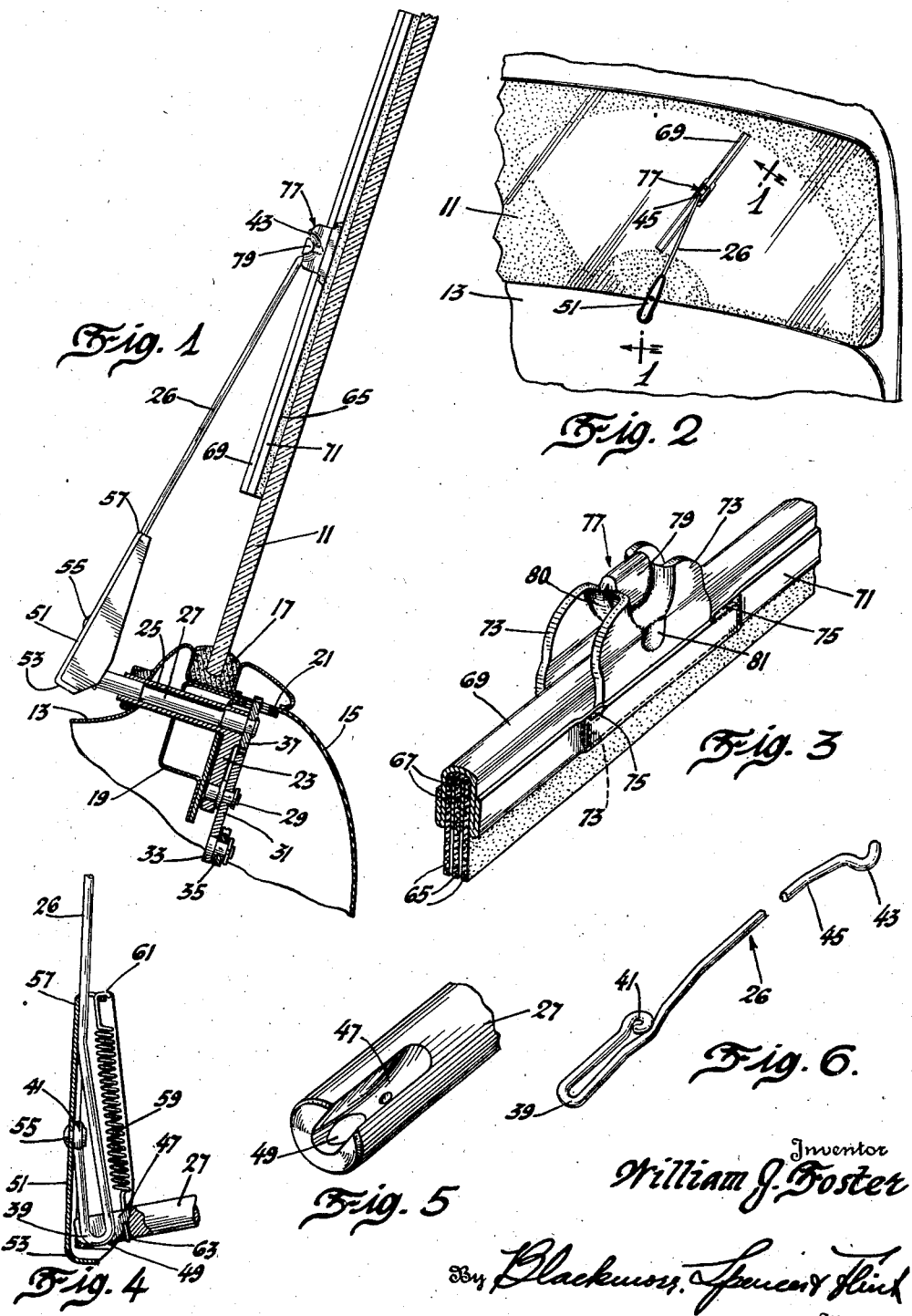
Inventor
William J. Foster
By Blackmore, Spencer & Flint
Attorneys Patented Sept. 12, 1939

2,172,791

UNITED STATES PATENT OFFICE 2,172,791

WINDSHIELD WIPER ARM

William J. Foster, Flint, Mich., assignor, by mesne assignments, to General Motors Corporation, Detroit, Mich., a corporation of Delaware Original application August 21, 1933, Serial No. 686,048. Divided and this application May 16, 1936, Serial No. 80,180

5 Claims. (Cl. 15—250)

This invention relates to windshield cleaners.

An object of the invention is to provide an improved assembly of rockshaft arm and cleaner blade.

A further object is to produce such assembly which shall be efficient in service and economical to manufacture.

Other objects and advantages will be understood from the following description.

In the drawing accompanying this description Fig. 1 is a transverse section through a vehicle windshield showing my novel assembly associated therewith, this view being taken on line 1—1 of Fig. 2.

Fig. 2 is a front elevation of the windshield with my invention applied thereto.

Fig. 3 is a perspective of the blade, holder and attaching clip.

Fig. 4 is a view in elevation, partly broken away and in section, showing the connection between the arm, the arm holder and the rockshaft.

Fig. 5 is a perspective of the end of the rockshaft.

Fig. 6 is a perspective of the arm, detached.

Referring by reference characters to the drawing, numeral 11 represents a windshield of a motor vehicle. Its position relative to the cowl 13 and the instrument board 15 is shown by Fig. 1. The windshield is supported above a base 17 located between the parts 13 and 15 as shown. Beneath the base 17 is a hollow transverse box-like member 19. This member extends transversely as will be understood from an inspection of Fig. 1.

Suitably mounted beneath extensions 21 of the box 19 is a bracket 23 having a tubular extension 25 within which is journaled a shaft 27. This shaft extends from a point beneath the instrument board forwardly and through the part 13, and to its end is secured the arm of the cleaner assembly to be described below. One or more of such shafts 27 may be used, depending upon whether one or more cleaner elements are made use of. The drawing shows one such shaft near one end of the windshield. In the event that two are used the second will be located near the other end of the windshield as is customary.

The invention is not concerned with the operating mechanism. There are shown, however, means to rock shaft 27. On bracket 23 is a pivot pin 29 which rotatably supports a gear segment 31. The gear segment includes an arm 33 to a pin on which is pivotally connected a link 35. The reciprocating movements of the link may be produced by any desired operating mechanism, and these reciprocating movements serve to rock the segment 31. The teeth of the segment mesh with the teeth of a pinion 37 mounted on shaft 27.

The cleaner arm takes the form of a rod 26 shaped as shown in Fig. 6. Near one end the rod is bent as at 39 to form a long leg and a short leg. The shorter leg is formed with an eye 41. At the end of the long leg is a hook 43 near which as at 45 the rod is bent from the line of extent of its major portion. This bend is provided so that the blade end of the rod may extend in a horizontal direction when at the end of its stroke, at which time the major part of the rod does not quite reach the horizontal position. In this way the blade on the end of the arm may be parked out of the line of vision of the operator.

The part 39 of the arm enters and rocks in an elongated groove 47 at the end of shaft 27. At 49 this groove is shown as cut through the material of the shaft, this aperture serving to receive and locate the extreme end of the part 39 of the rod as shown in Fig. 4. There is thus determined a pivot point for the arm as it swings in the groove.

At 51 is a cover of substantially U-shape in cross section. The cover has a closed end 53 surrounding the end of shaft 27. The eye 41 of the arm is secured to the cover as by a rivet 55 or other suitable attaching means. The long leg 30 of the arm extends through the cover and beyond its open end as at 57. A spring 59 is secured at its ends to the cover as at 61 and to the shaft 27 as at 63. In this way the part 39 of the arm is held firmly in the opening 49 of the groove 47, thus providing a definite fulcrum for the arm. The elongated dimension of the groove permits the spring 59 to rock the arm clockwise (Fig. 4) about its pivot at 49 to thereby hold the blade, which is carried on the end of the arm, firmly against the windshield.

The blade comprises a holder and one or a plurality of wiping elements 65 and spacing means 67. The blade holder is designated by numeral 69. It is of U-shape in section and serves to clamp the wiper elements and spacers. The extremities of its side walls are bent back as at 71 to thereby stiffen the holder. A U-shaped attaching member or clip 73 is employed to connect the blade holder to the arm. The side walls of the clip 73 lie adjacent the side walls of the holder and are gripped by the bent-over ends 75 as shown. The attaching member is thus held firmly in engagement with the holder. The side walls of the clip 73 are connected by a short bridge portion 77 under which is received the hooked end 43 of the arm as shown in Fig. 1. These side walls are pinched as at 79 to provide an efficient bearing boss or shoulder 80 for the engagement of the hook 43. Furthermore there are pressed in regions 81 which engage the side walls of the hook and guide it, to the end of minimizing any tendency of the blade and holder to flop at its connection with the arm. There are thus three regions of contact to prevent or minimize any undesired blank movement.

The operation will be obvious upon inspection. As the shaft 27 rocks to and fro the wiper elements clean the region of the windshield shown as cleared on Fig. 2. Spring 59 holds the part 39 of the arm firmly in the opening 49 and also exerts a force tending to rock the arm in such a direction as to hold the wiper firmly yet resiliently against the glass. The tendency of the blade to flop about its connection with the arm as it sweeps in opposite directions is minimized by the portions 81 of the member 77. Also, the walls 80 of the clip formed by the pinched portions 79 afford an efficient bearing boss for the curved part of the hook 43.

This application is a division of my application Serial Number 686,048, filed August 21, 1933.

I claim:

1. A windshield wiper having a clip for attachment to a hook shaped carrying arm, said clip having spaced sides and each side having within its margins an inwardly offset flat faced portion arranged in opposition to a companion offset portion in the opposite side and forming therewith a rounded shoulder enclosed by the sides and spaced from the back of the wiper to permit sliding engagement of the arm hook thereunder and about the rounded shoulder, said shoulder preventing accidental displacement of said wiper from the arm hook, the flat faces of the offset portions contacting each other and serving to support the spaced sides at points within the body lines of the clip.

2. A windshield wiper having a U-shaped clip inverted over the back thereof, the spaced sides of the clip straddling the wiper body and having inwardly offset portions contacting each other to support the sides apart at points within the body lines of the clip and spaced from the wiper body, said sides having portions pressed inwardly beneath the offset portions and spaced apart to receive the attaching portion of the mounting arm.

3. A windshield wiper having an arm attaching part comprising opposing sides spaced apart to receive a hooked terminal of a wiper carrying arm, said wiper having an arm bearing portion between the spaced sides on which the carrying arm is adapted to bear during wiping operation, said sides being formed with inwardly offset portions opposing each other and arranged in contact with one another to provide an arcuate boss within the confines of the side walls for laterally bracing the latter, said boss being spaced outwardly from said bearing portion to slidably receive the hooked terminal of the arm therebetween, whereby the arm is slidably retained between the bearing portion of the wiper and the braced side walls of the attaching part.

4. A windshield wiper having a clip for attachment to a hook shaped carrying arm, said clip having spaced sides and each side having within its margin an inwardly offset flat faced portion arranged in opposition to a companion offset portion in the opposite side and forming therewith a shoulder, said offset portions being enclosed by the sides and spaced from the back of the wiper to permit sliding engagement of the arm hook under and about said shoulder, the flat faces of the offset portions contacting each other and serving to support the spaced sides at points within the body lines of the clip, said shoulder preventing accidental displacement of said wiper from the arm hook.

5. A windshield wiper having an arm attaching means comprising opposing side members spaced apart to receive a hooked terminal of a wiper carrying arm, said wiper having an arm bearing portion between the spaced sides on which the carrying arm is adapted to bear during wiping operation, said sides being formed with inwardly offset portions opposing each other and arranged in contact with one another to provide a boss within the confines of the side walls for laterally bracing the latter, said boss being spaced outwardly from said bearing portion to slidably receive the hooked terminal of the arm therebetween, whereby the arm is slidably retained between the bearing portion of the wiper and the braced side walls of the attaching part.

WILLIAM J. FOSTER.